(12) United States Patent
Holfelder et al.

(10) Patent No.: US 12,515,410 B2
(45) Date of Patent: Jan. 6, 2026

(54) HATCH REVERSAL WITH KEYHOLE TRANSFER

(71) Applicant: EOS GmbH Electro Optical Systems, Krailling (DE)

(72) Inventors: Peter Holfelder, Neufahrn bei Freising (DE); Jochen Philippi, Neuried (DE); Christoph Seyfert, Neuried (DE)

(73) Assignee: EOS GmbH Electro Optical Systems, Krailling (DE)

( * ) Notice: Subject to any disclaimer, the term of this patent is extended or adjusted under 35 U.S.C. 154(b) by 383 days.

(21) Appl. No.: 17/783,444

(22) PCT Filed: Nov. 19, 2020

(86) PCT No.: PCT/EP2020/082781
§ 371 (c)(1),
(2) Date: Jun. 8, 2022

(87) PCT Pub. No.: WO2021/115756
PCT Pub. Date: Jun. 17, 2021

(65) Prior Publication Data
US 2023/0008970 A1    Jan. 12, 2023

(30) Foreign Application Priority Data
Dec. 10, 2019   (DE) .......................... 102019219276.9

(51) Int. Cl.
*B29C 64/393* (2017.01)
*B22F 10/366* (2021.01)
(Continued)

(52) U.S. Cl.
CPC .......... *B29C 64/393* (2017.08); *B22F 10/366* (2021.01); *B29C 64/153* (2017.08);
(Continued)

(58) Field of Classification Search
CPC ........ B22F 10/28; B22F 10/366; B22F 10/80; B29C 64/153; B29C 64/393; B33Y 10/00; B33Y 30/00; B33Y 50/00; Y02P 10/25
See application file for complete search history.

(56) References Cited

U.S. PATENT DOCUMENTS

| 5,182,055 A | 1/1993 | Allison et al. |
| 2015/0367577 A1 | 12/2015 | Coeck |

(Continued)

FOREIGN PATENT DOCUMENTS

| DE | 102018205688 | 10/2019 |
| DE | 102018205689 | 10/2019 |

(Continued)

OTHER PUBLICATIONS

International Search Report for PCT Application No. PCT/EP2020/082781, dated Feb. 10, 2021, 3 pages.

*Primary Examiner* — Xiao S Zhao
*Assistant Examiner* — Victoria Bartlett
(74) *Attorney, Agent, or Firm* — Polsinelli PC

(57) ABSTRACT

Disclosed is a method for providing control data for manufacturing a three-dimensional object including accessing computer-based model data of at least one portion of the object, at least one data model specifying the scanning of locations of the region to be selectively solidified, using at least one beam along a first trajectory and a second trajectory substantially parallel thereto, the motion vectors of the beams in the construction plane having mutually opposite directional components during the scan along the two trajectories, and the distance between a starting point of the second trajectory and an end point of the previously scanned first trajectory is less than half a beam width of the beam at the end point of the first trajectory; and providing control
(Continued)

data of the at least one data model for the generation of a control data set.

7 Claims, 10 Drawing Sheets

(51) Int. Cl.
    *B29C 64/153*     (2017.01)
    *B33Y 10/00*     (2015.01)
    *B33Y 30/00*     (2015.01)
    *B33Y 50/00*     (2015.01)

(52) U.S. Cl.
    CPC ............... *B33Y 10/00* (2014.12); *B33Y 30/00* (2014.12); *B33Y 50/00* (2014.12)

(56) References Cited

U.S. PATENT DOCUMENTS

| | | |
|---|---|---|
| 2018/0043432 A1 | 2/2018 | Domrose |
| 2018/0272611 A1 | 9/2018 | Cantzler et al. |
| 2020/0306883 A1* | 10/2020 | Wilson ................... B33Y 50/02 |
| 2020/0346303 A1* | 11/2020 | Xiao ..................... B23K 26/342 |
| 2021/0001561 A1 | 1/2021 | Hamann et al. |
| 2021/0245251 A1 | 8/2021 | Mattes et al. |

FOREIGN PATENT DOCUMENTS

| | | |
|---|---|---|
| EP | 3199327 | 8/2017 |
| WO | 2016110440 | 7/2016 |
| WO | 2016169784 | 10/2016 |
| WO | 2018184725 | 10/2018 |
| WO | 2019206919 | 10/2019 |

\* cited by examiner

HATCH REVERSAL WITH KEYHOLE TRANSFER

TECHNICAL FIELD OF THE INVENTION

The present invention refers to a device and a method for providing control data for an additive manufacturing apparatus, to a correspondingly adapted additive manufacturing method, to a corresponding device for controlling energy input devices of an additive manufacturing apparatus, to a correspondingly adapted additive manufacturing apparatus and to a correspondingly adapted computer program.

BACKGROUND OF THE INVENTION

Additive manufacturing apparatuses and corresponding methods are generally characterized by the fact that objects are manufactured in the same by a solidification of a shapeless building material layer by layer. The solidification can for example be effected by supplying heat energy to the building material by irradiating the same with electromagnetic radiation or particle radiation (e.g. laser sintering (SLS or DMLS) or laser melting or electron-beam melting). For example, in laser sintering or laser melting, a laser beam is moved across those positions of a layer of the building material that correspond to the object cross-section of the object to be manufactured in this layer, so that the building material is solidified at these positions.

FIG. 10 shows the conventional approach in additive manufacturing of objects by means of irradiation of a building material with electromagnetic radiation or particle radiation (e.g. laser sintering (SLS or DMLS)) or laser melting or electron-beam melting). In FIG. 10, an object cross-section 50 is divided into an inner region or core region 52 and a contour region 51, wherein usually for the energy input into the building material other parameters are assigned to the contour region 51 then to the inner region 52. For example, the contour region 51 is scanned with a laser beam, which is an example for a beam, such that the laser beam is moved along the course of the contour. Usually, the inner region 52 is solidified by dividing the inner region 52 into partial regions 53 that usually have an approximately rectangular or quadratic shape and thus are also designated as "stripes" or "squares". The inner region 52 then is scanned with the laser beam partial region by partial region.

As shown in FIG. 10, in each partial region 53, the laser beam is moved across the building material along parallel paths (hatch lines) 54, resulting in a hatch-like movement pattern when scanning of each partial region 53 with the laser beam. In technical jargon, this process is termed "hatching". Here, in FIG. 10 the movement direction of the laser beam is illustrated by arrows. It can be seen that the movement directions for neighboring hatch lines 54 are opposed to each other.

FIG. 11 illustrates how such a movement pattern of the laser beam can be obtained, wherein only two hatch lines 64, 65 of the region 53 are shown. The initial point and the terminal point of the hatch line or trajectory 64 are designated with reference numbers 64A and 64E, respectively. The initial point and the terminal point of the hatch line 65 are designated with reference numbers 65A and 65E, respectively. In FIG. 11, the laser beam enters the region 53 on the top left and scans the building material in the region 53 along the upper hatch line 64. At the end 64E of the hatch line, meaning when the laser beam has arrived at the boundary of the partial region 53, the laser beam is switched off and the movement direction of the laser beam is changed inside of the turning region 55 without supplying radiation to the building material, so that afterwards the laser beam can be moved across the building material in the partial region 53 in an opposite movement direction along hatch line 65, which is second from the top. Following this movement pattern, the whole partial region 53 is then scanned, as illustrated in FIG. 11.

For this approach, which is known from the prior art, the inventors could observe, in particular for metal powder as building material, that an increased ejection of material (splashes) occurs at the start of a new hatch line. e.g. at the right end 65A of the hatch line 65, which is the second from the top in FIG. 11, when the laser beam is switched on again. This may locally lead to an adverse effect on the quality of the manufactured object. In particular, the mechanical properties of the manufactured object can be worse.

SUMMARY OF THE INVENTION

Therefore, the object of the present invention is to provide a method and a device, by which the part homogeneity of objects manufactured by an additive manufacturing method can be improved.

The object is achieved by a computer-based method, an additive manufacturing method, a device for providing control data, a device, an additive manufacturing apparatus, and a computer program as described herein. In particular, a device according to the invention can be developed further also by features of the methods described herein. Moreover, the features described in connection with one device to the invention may also be used for a further development of another device according to the invention, even if this is not explicitly stated.

An inventive computer-based method of providing control data for an additive manufacturing apparatus for manufacturing a three-dimensional object, wherein the object is manufactured by the additive manufacturing apparatus by applying a building material layer upon layer and by solidifying the building material in a building plane by supplying radiation energy to positions in each layer assigned to the cross-section of the object in this layer in that these positions are scanned with at least one beam along a plurality of trajectories in accordance with a set of energy input parameter values comprises:

a first step of accessing computer-based model data of at least one portion of the object to be manufactured, a second step of generating at least one data model of a region to be selectively solidified of a building material layer for the manufacture of at least one object portion, wherein the data model specifies a scanning of positions of the region to be selectively solidified along a first trajectory and along a second trajectory substantially parallel thereto with at least one beam, wherein the movement vectors of the beam in the building plane have directional components opposed to each other during the scanning along the two trajectories, wherein it is specified that an initial point of the second trajectory has a distance from a terminal point of the previously scanned first trajectory that is smaller than half of the beam width of the beam at the terminal point of the first trajectory and a third step in which control data according to the at least one data model generated in the second step are provided for the generation of a control data set for the additive manufacturing apparatus.

Additive manufacturing apparatuses and methods to which the present invention refers are in particular those, in which energy is selectively supplied to a layer of a shapeless building material as electromagnetic radiation or particle radiation. Here, the working plane (also designated as building plane) is a plane located on the upper side of that layer to which the energy is supplied. Here, the energy input device can for example comprise a laser or an electron beam source. The radiation supplied to the building material heats the same and thereby effects a sintering or melting process. The present invention comprises in particular laser sintering apparatuses, laser melting apparatuses and electron beam melting apparatuses as well as the corresponding methods. An application of the invention in connection with additive manufacturing methods and apparatuses, in which a metal or at least metal-containing building material such as a metal powder or metal alloy powder is used, is of particular advantage.

It shall be mentioned here that by an additive manufacturing apparatus not only one object but also a plurality of objects can be simultaneously manufactured. If in the present application the manufacturing of an object is mentioned, it is self-evident that the respective description is in the same way applicable also to additive manufacturing methods and apparatuses, in which several objects are manufactured at the same time.

Here, a control dataset (often also termed "control command set") is regarded to be a sequence of instructions to subsequently apply layers of the building material and to scan regions of the respective layers that correspond to the cross-section of an object to be manufactured with energy radiation in order to solidify the building material.

In detail, a control dataset is based on a computer-based model of the object(s) to be manufactured, preferably a CAD model. During manufacture, the control dataset specifies for each layer the positions, at which a solidification of the building material shall be effected by a supply of radiation and optionally a thickness of the layer. Furthermore, a control dataset often also includes information that is specific for the manufacturing apparatus, for example with respect to the position and orientation of the objects in the additive manufacturing apparatus. Here, the control dataset usually contains all data that are necessary for a control of the energy input device, whereby i.a. the radiant flux in the beam and/or the movement velocity of the beam across the building material and/or an irradiation pattern are specified.

Here, the term "beam" is used instead of "ray" in order to express the fact that the diameter of the ray need not necessarily be very small, in particular if the radiation impinges on the building material at an angle or if radiation is used that when impinging on the building material shall purposefully cover a larger area (for example, when an irradiation array is used).

The control dataset can be regarded as entirety of all control data that are specified for the control of the manufacturing process in an additive manufacturing apparatus. Here, the control data related to a single layer are usually referred to as layer dataset. In particular, in the present application a layer dataset is assumed to contain a data model of positions of an object cross-section to be solidified during the manufacturing process. Such a data model usually is obtained from computer-based model data of the object to be manufactured, in particular a CAD model of the object to be manufactured, by dividing the CAD model into layers (in technical jargon named "slicing"). However, it is also conceivable to extract a two-dimensional representation of the object cross-section, which is to be solidified in a layer by means of one or more beams, from the computer-based CAD model of the object in a different way. In the layer dataset, positions corresponding to an object cross-section, which are to be solidified in the corresponding building material layer, are specified. Furthermore, still more information with regard to the manufacturing of the object cross-section may be included, in particular the temporal sequence by which positions corresponding to an object cross-section are to be solidified, meaning a scanline or trajectory, along which the beam shall be moved, or e.g. the layer thickness or irradiation parameter values such as the diameter or the speed of movement of a beam impinging on the building material, etc. It shall be emphasized that there also exist special cases, in which a layer dataset does not refer to a complete object cross-section, but only to a part of the same.

Here, it shall be mentioned that energy input devices to be controlled often show inertia, which may lead to a deviation of the actual movement of a beam across the building plane from a trajectory specified in a data model (for example, at corners, meaning positions at which there is an abrupt change of direction). How these deviations can be taken into consideration by corresponding changes of the data model already when the control data are specified, is known to the skilled person (see e.g. DE 10 2018 205 689 A1). Therefore, the present application does not go into details of these possibly necessary changes of the data model and it is assumed that the movement of a beam actually happens in the way it is specified in the control data. By a skilled person, the possibly necessary changes of the data model can be additionally made in the control data provided in accordance with the invention at any time.

The computer-based model data may for example be a model of the object portion to be manufactured that exists e.g. as CAD model or has been converted into the STL format and still contains no information on the segmentation into layers for a layer-wise manufacture. It is also conceivable that the model data exist in a GML (Generative Modeling Language) description. Alternatively, the computer-based model data may be a number of layer data sets, each of which contains a data model of a region to be selectively solidified of a building material layer during the manufacture, which region corresponds to a cross-section of the object portion. Here, it shall be mentioned that in the present application the term "number" always is understood in the meaning of "one or more". Moreover, it shall be remarked that the object portion need not necessarily refer to only a part of the object to be manufactured, but may also comprise the whole object to be manufactured.

An access to the model data may be such that the model data are read from a storage or else are received via a network. Here, the model data of the whole object portion need not necessarily be read at one time. It is also possible that there is a larger distance in time between the access processes to parts of the model data, for example, when during the manufacturing process of an object portion parts of the model data are read from a storage (which may e.g. also be accessed from the additive manufacturing apparatus) or are read via a network each time they are needed, wherein a generated data model then is integrated into the control data set during the manufacturing process. Thus, an additive manufacturing apparatus can change the control data set for its control by itself based on the method according to the invention.

If the model data that are accessed in the first step already comprise a number of layer datasets, the generation of at least one data model in the second step can be a change of a data model of a building material layer already present in the model data. Otherwise, a data model of a building material layer (or of a part thereof) can be generated for the first time in the second step.

A trajectory of a beam specified in the data model is assigned to a solidification path in the working plane, along which the building material is to be solidified without interruptions in time and space, i.e. in one go or, in other words, by continuously relocating the melt pool in a direction parallel to the building plane, preferably by a keyhole welding process. In particular, solidification paths may be regarded to be those scan line(s) (section(s)), where the scanning of the building material by the at least one beam actually causes a solidification of the building material and not only a heating of the same. A solidification path may e.g. be a straight line segment of a certain width, along which the building material is solidified during scanning. However, there are also cases in which one or more changes of direction occur when a beam is moved along the solidification path, in particular in which the solidification path is geometrically a curved line of a certain width. The region to be selectively solidified, in which the first trajectory and the second trajectory are specified, can e.g. comprise one or more of the partial regions 53 in FIG. 10.

When in the data model generated in the second step a scanning with at least one beam is specified, this means that in the scanning process the at least one beam acts on the building material such that a solidification of at least one uppermost layer of the building material is effected, meaning that the building material is not only preheated or post-heated but is at least partially melted.

When the building material is solidified along a trajectory, it is partially or completely melted due to the energy supply by the beam during the scanning of the building material. As a result, the components of the building material (e.g. powder grains) coalesce. After cooling, the building material then exists as a solid.

It should be mentioned that there may be building materials such as alloys, for which no unique melting point but a melting interval is defined. In principle, in such a case one may speak of a partial melting already when the solidus temperature, i.e. the lower limit of the melting interval, is exceeded. However, the present invention can preferably be applied to cases in which the building material is completely melted, i.e. the liquidus temperature or the upper limit of the melting interval is exceeded.

Since the transitions between partial (i.e. superficial in the case of powder grains) melting (e.g. liquid phase sintering) and complete melting (melting) are fluid, the terms sintering and melting are used synonymously in the present application. In any case, the present invention can be specifically applied in additive manufacturing apparatuses, in which a complete melting of the building material, in particular by means of a keyhole welding process, occurs when a beam is directed to the building material.

The length of a solidification path corresponds, for example, to the width of a partial region (often stripe-shaped or rectangular) of a cross-section of the object to be solidified. If an object cross section is solidified by means of a beam in a hatch pattern, such solidification paths are also called "hatch lines". In particular, the length of a solidification path can then also correspond to the dimension of the object cross-section in the direction of the course of the hatch lines, wherein the width of a contour line framing the cross-section still needs to be subtracted from this dimension as the case may be. Alternatively, the length of a solidification path may also correspond to the distance between the edge of a (often rectangular or quadratic) partial region of an object cross section and the edge of the object cross section or the contour line.

When the building material is scanned along a trajectory with a beam, the extension of the beam perpendicular to the movement direction of the beam, meaning the beam width, will be defined as minimum width of the resulting solidification path. Here, the present invention refers to a first and to a second trajectory that are adjacent to each other, meaning that the distance of the second trajectory from the first trajectory is at most five times the beam width of the beam when the beam is moved along the first trajectory, preferably at most three times the beam width, further preferably at most the beam width. Here, the distance is determined perpendicularly to the movement direction of the beam on the first trajectory. Here, sections of the first trajectory, in which a perpendicular to the movement direction of the beam along the first solidification path has no intersection point with the second trajectory are not considered for the determination of the maximum distance.

Preferably, the first trajectory and the second trajectory run substantially in parallel to each other, e.g. for at least 80%, preferably at least 95%, of the length of the shorter of the two. However, it is also possible that the first trajectory and second trajectory run adjacent to each other under an angle of less than 30°, preferably less than 20°, further preferably less than 10°, most preferably less than 5°. Running adjacent to each other means that a perpendicular on the shorter trajectory intersects the other trajectory for at least 90%, preferably at least 95%, of the length of the shorter of the two trajectories.

In general, the present invention is in particular directed to hatch lines as first and second trajectories that are used for an areal solidification of regions. When the invention is applied to the solidification of stripe-shaped or quadratic partial regions, meaning when the first trajectory and second trajectory are hatch lines when scanning such partial regions, the first trajectory and the second trajectory have the same length. Otherwise, in particular when the regions to be solidified are not rectangular or the trajectories are not perpendicular to the edges of a partial region, the hatch lines may also have different lengths.

The initial point and the terminal point of a solidification path in the building plane are assigned to the initial point and the terminal point, respectively, of a trajectory. However, while a point as such on a trajectory in a data model does not have any extension, an area corresponds to this point in the building plane, inside of which area the building material is melted by the action of a beam having a diameter different from zero. Here, the extension of the melt pool that develops has an influence on the width of the solidification path, meaning the hardened region later on. The extension of the melt pool depends on the extension of the beam (its diameter) when impinging on the building material. Typically, positions of the building material to be irradiated are coded in the control data for controlling the at least one beam as points in a coordinate system. Such points can be defined two-dimensionally (related to a layer) and/or three-dimensionally (related to a building volume of the manufacturing apparatus, i.e. to a plurality of layers). Information on an extension of the beam when it is incident on the building plane can be linked to these points. Thus, in a data space for preparing a manufacturing process, an initial point and/or a terminal point of a solidification path may well exist as mathematical points and the solidification path may exist as line (trajectory). The direction of scanning along a trajectory or of solidification along a solidification path usually is from the initial point to the terminal point, wherein the initial point is the position on a trajectory that is scanned at first and the terminal point is the position on a trajectory that is scanned last. In order to avoid misunderstandings, it is emphasized here that when the initial point or the terminal point of a trajectory are defined, swinging movements of the beam around the initial point or terminal point (wobbling) are not taken into consideration.

If the distance between the solidification paths is sufficiently small, the second trajectory need not lie immediately adjacent to the first trajectory. Rather, the second trajectory can also relate to the next but one or next but two solidification path. Thus, in such a case, a solidification path touches the next but one or the next but two solidification path. Here, it shall be emphasized that neighboring solidification paths need not necessarily be at a distance from each other, but rather can overlap with each other by 5% or 10%. Moreover, the scanning of the second trajectory need not necessarily follow immediately in time after the scanning of the first trajectory. Rather, it is also possible to scan along other trajectories in the time interval in-between, even if a scanning along the second trajectory immediately after the scanning along the first trajectory is a preferred approach.

A distance between a terminal point of a trajectory and an initial point of the trajectory following in time can be determined by a comparison of the positions of the initial point and the terminal point in the data model or data space. As an alternative to half of the beam width of the beam taken as maximum value of the distance between the initial point and the terminal point, it is also possible to choose as maximum value half of the distance between the beam axes of the energy beam at the terminal point, thus the position of coupling out, and at the initial point, thus the position of coupling in again. This distance between the beam axes then has to be set such that it is smaller than 50% of the larger one of the two beam widths, preferably smaller than 30%, more preferably smaller than 10% of the larger one of the two beam widths. A further alternative is to choose the distance between the initial point and the terminal point such that the areas of incidence of the beams at the initial point and at the terminal point overlap with each other by at least 50%.

Here, the beam axis of an energy beam is defined such that it runs through the geometric center of a virtual area of incidence of the energy beam, such virtual area of incidence lying in a plane intersecting the energy beam that is perpendicular to the beam axis. The beam axis may run through a center point of the virtual area of incidence and/or be identical to a beam propagation direction. For example, for an energy beam having a Gaussian intensity profile it may run through the central intensity maximum. In the context of the present application, an intensity profile of an energy beam comprises the spatial shape and extension, respectively, of the energy beam in the sectional plane (sectional area) perpendicular to the beam axis and also the spatial distribution of the intensity in the sectional plane, meaning in particular the positions of maxima and minima, etc. The intensity profile in the sectional plane perpendicular to the beam direction or direction of incidence—where a sectional plane at the build area, meaning shortly before the incidence onto the build area, is considered—in most situations does not correspond exactly to the intensity profile directly on the surface of the build are (thus inside the area of incidence of the beam), as the energy beam often impinges obliquely on the build area. However, this does not rule out that in the course of the process it again and again happens that the mentioned sectional plane and virtual area of incidence, respectively, coincide with the actual area of incidence, when the energy beam is just perpendicular to the area of incidence.

In this context, an extension of a beam is understood to be any dimension and extension, respectively, of the area of incidence of the beam transverse to the direction of movement of the beam in the building plane, in particular a beam width, wherein a beam width is always understood to be the extension perpendicular to the actual direction of movement of the area of incidence on the build area. Here, the beam extension need not necessarily cross the beam axis and the center of the intensity profile in the building plane, respectively, in particular when the energy beam does not have a rotationally symmetric intensity profile and/or impinges at an angle. Here, the beam extension is defined such that it runs from one edge of the intensity profile in the building plane to the opposite edge, wherein the average here discretionarily is defined such that 95%, preferably 99% of the radiant flux of the energy beam are incident on the building plane inside of the edges (i.e. in the area enclosed by the edges).

A beam extension or beam width of a beam can in particular be determined by at first determining the area of a region of the building plane that is reached by 95% and 99%, respectively, of the radiant flux, when the radiation is incident at a right angle. This may for example be effected by arranging a radiation measurement device, e.g. a semiconductor detector or an IR camera, in the building plane. Preferably, the determination of the beam extension is carried out for a radiant flux which is in the same order as the radiant flux used for the solidification of the building material.

In particular, when the area of incidence of the beam has eccentricity, which is understood to be the ratio of the largest diameter to the smallest diameter, instead of half of the beam width, half of a medium diameter of the beam instead of half of the beam width can be set as maximum distance between the initial point of the second trajectory and the terminal point of the previously scanned first trajectory. Here, the medium diameter corresponds to the medium value of all cuts through the area of incidence of the beam. The medium diameter can be determined by determining at first the area of the region of the building plane, which is reached by 95% and 99%, respectively. Then, the medium diameter is defined to be a diameter of a symmetric figure having the same area. If the area of incidence has an elliptical shape, for example, the diameter of a circle having the determined surface area or the determined area may be regarded as medium diameter of the beam. In cases, where the area of incidence has a polygon-like shape, alternatively the diameter of a circumscribed circle of a regular polygon such as a pentagon may be defined as medium diameter.

It shall be added that control data provided for the generation of a control data set may on the one hand consist of the at least one data model itself generated in the second step. On the other hand, the at least one data model may still be processed in accordance with possible format requirements for the integration into the control data set.

The inventors could find that in the production of objects the process quality can be improved, if one proceeds in the described way when solidifying partial regions 53, the so-called "hatching". In particular, this does apply to manufacturing methods, in which a keyhole welding process occurs when the radiation acts on the building material. An explanation for this is the following:

When solidifying metal powder in selective laser beam sintering and laser beam melting, respectively, the building material is melted by means of a keyhole welding process. In a keyhole welding process, the temperatures generated in the material are so high that an evaporation occurs and in particular the radiation enters a vapor capillary at the surface of the material. In particular, more energy can then be introduced into the material due to multiple reflection at the sides of the vapor capillary. The temporarily formed vapor capillary is also designated as "keyhole". When at the initial point of a solidification path the radiant flux incident on the initial point is increased, for a stable melting process a keyhole must be formed at first. Here, a melt pool is generated that reaches to a larger depth than the layer thickness of the previously applied powder layer. For example, the melt pool reaches to a depth that corresponds to two to three times the layer thickness. In particular, this means that at first material has to be evaporated, which can lead to an increased formation of splashes.

According to the invention, the initial point (better initial region) of a solidification path overlaps the terminal point (better terminal region) of a prior solidification path. Thereby, the following effect can be utilized at the terminal point of a solidification path:

If at the terminal point of a solidification path the radiant flux incident on the terminal point is abruptly reduced so much that the energy input per unit area decreases below the energy per unit area necessary for a melting of the building material (for example, by switching off the beam), the temporarily formed vapor capillary, meaning the "keyhole", is no longer able to fill with molten material due to the quick hardening process and a crater is formed. As in the described approach the initial point of a trajectory is very close to the terminal point of a previously scanned trajectory, when the beam is switched on again at the initial point of the following trajectory, the beam enters at least partially the crater. Due to a multiple reflection of the beam at the crater walls, the absorption of radiation is improved and thus instead of the onward movement of the beam the stable end condition, in which a keyhole welding process occurs, can be reached already close to the initial point. Accordingly, less material ejection occurs, which results in a better part quality. Furthermore, the crater at the terminal point of a solidification path, which as such is disadvantageous, is at least partially removed when the beam moves away from the initial point when scanning the second solidification path is scanned.

The more the initial point of a solidification path overlaps with the terminal point of a previous solidification path the better the already existing crater can be used and the quicker a stable end condition can be reached. However, part quality can already be improved for an overlap that is only partial as already for a partial overlap the heating process of the building material at the initial point can be quicker. Preferably, the positions of the initial point and of the terminal point that are specified in the data model generated in the second step, are at a distance from each other that is smaller than 50% of the beam width of the beam at the terminal point of the first trajectory, more preferably at a distance that is smaller than 30% of the beam width, most preferably at a distance that is smaller than 10% of the beam width.

The invention in all its embodiments is not limited to the transition from a first trajectory to a second trajectory. Rather, one can proceed in the described way for all transitions from one trajectory to a subsequent trajectory in an object portion. In particular, the approach can be consistently applied within a total object cross-section or within a partial region of the same, even for a complete object to be manufactured. In other words, a transition from one trajectory to the next always occurs in the same way.

Preferably, the method provides control data for the manufacturing of a three-dimensional object from a metal-based building material and sets the radiant flux incident on the initial point, preferably the radiant flux specified for the second trajectory during the scanning of the whole second trajectory, and/or the radiant flux incident on the terminal point, preferably the radiant flux specified for the first trajectory during the scanning of the whole first trajectory, such that a keyhole welding process occurs when the radiation acts on the building material.

The examination of the type of welding process can e.g. be done by observing the melt pool by means of a camera (optical, IR, UV), by the analysis of the radiation emitted by the melt pool or else by analyses at test objects manufactured in pre-tests. Emissions that are caused by the vapor capillary generated in the keyhole welding process, meaning splashes and jets, respectively, as well as metal vapor, can be used as criterion for the existence of a keyhole welding process. A further criterion is the aspect ratio of the melt pool (width of the melt pool in parallel to the working plane in relation to the depth, i.e. perpendicular to the working plane), which should be below 1 for keyhole welding, or else the surface temperature of the building material. If the latter is below the vaporization point of one or all of the components of the building material, then the "keyhole" required for the deep penetration welding process cannot be formed. If the power introduced per unit area exceeds 1 $MW/cm^2$, usually a keyhole welding process exists.

Further preferably, a first movement speed v1 is set for the movement of the beam along the first trajectory, wherein the beam is moved across the terminal point with at least 80%, preferably at least 90%, more preferably with 100%, of the value of the first movement speed, and/or a second movement speed v2 is set for the movement of the beam along the second trajectory, wherein the beam is moved across the initial point with at least 80%, preferably at least 90%, more preferably with 100% and/or at most 120%, preferably at most 110%, of the value of the second movement speed v2.

While for the movement along the solidification paths the goal is to solidify the building material, the opposite is true for the movement between the terminal point and the initial point. No building material shall be solidified here. By specifying a minimum speed for the scanning of the terminal point of the first trajectory, it is possible to limit the time necessary for the transition to the following second trajectory. Furthermore, the process conditions for a scanning along the first trajectory with the specified speed have been scrutinized. A deviation from this speed that is too large involves the risk that the solidification process has to take place under process conditions that are not so well examined.

By specifying a minimum velocity for the scanning of the initial point of the second trajectory, it is possible to provide for process conditions in the scanning of the second trajectory that are as homogeneous as possible. Usually, the process conditions for a scanning along the second trajectory with the specified speed have been scrutinized. A deviation from this speed that is too large involves the risk that the solidification process has to take place under process conditions that are less precisely defined. Preferably, the same value is set for the scanning speeds of the first trajectory and second trajectory. More preferably, the same value is set for the scanning speeds of the initial point and of the terminal point Further preferably, in the process the direction of incidence of the beam at the initial point of the second trajectory is set such that it is at an angle to the direction of incidence of the beam at the terminal point of the first trajectory, which is smaller than 15°, preferably smaller than 10°, further preferably smaller than 5°, particularly preferably smaller than 1°. In particular, when for the scanning of the terminal point of the first trajectory the beam is not perpendicularly incident on the building plane, but at an angle, the vapor capillary will form such that it is not perpendicular, but extends into the depth under an angle. Accordingly, in order for the beam in the scanning of the initial point of the second trajectory to be able to enter well the crater that has been left, the beam should be incident on the building plane from approximately the same direction. Here, the direction of incidence can be neatly defined by means of spherical coordinates with the coordinate origin at the initial point or terminal point, thus by specifying an angle in the building plane and an angle to the perpendicular to the building plane. Of course, in the case, in which the beam is incident perpendicular to the building plane when scanning the terminal point of the first trajectory, when scanning the initial point of the second trajectory, the beam should also be incident perpendicular to the building plane, if possible. In particular, when the second trajectory is scanned with another beam than the first trajectory, it is important to make sure that the solid angle between the two directions of incidence is limited. If the beam for scanning the second trajectory is directed to the building plane by means of another scanner than the beam for scanning the first trajectory, the other scanner will usually have a different position above the building plane, from which automatically result different directions of incidence. The specification of an upper limit for the angle accordingly influences the decision, by which beam which trajectory can be scanned.

Further preferably, it is specified in the method that a beam is directed to the initial point of the second trajectory that is different from the beam that was directed to the terminal point of the first trajectory.

When the second trajectory is scanned with a different beam than the first trajectory, the scanning of the first trajectory can transition quickly to the scanning of the second trajectory. In this case, it is not necessary to change the direction of movement of the beam and/or to decelerate/accelerate the movement in a possibly elaborate way as the other beam is directed to the second trajectory using a different deflection device from that for scanning the first trajectory.

Further preferably, in the method a solidification of the building material partial region by partial region is specified in the second step, wherein each partial region comprises a plurality of first and second trajectories, wherein at least one first partial region and second partial region adjoin each other at a boundary such that initial points and terminal points of the first and second trajectories of the first partial region adjoin initial points and terminal points of the first and second trajectories of the second partial region, wherein at the boundary initial points of the second trajectories of one partial region are facing an interspace between initial points of the second trajectories in the other partial region and/or are facing an interspace between the second trajectories in the other partial region.

The mentioned partial regions may for example be the partial regions 53 shown in FIG. 10, meaning stripe-shaped or quadratic regions. In each of these partial regions the building material is scanned with a beam in a hatching style along trajectories (hatch lines), wherein often the trajectories run substantially in parallel to each other. Here, the initial points and the terminal points of the individual trajectories usually define the boundary of its partial region, so that at a boundary between two partial regions, initial points and terminal points of trajectories are adjacent to those in the other partial region meaning they are adjoining each other. For this implementation of the invention, the positions of the initial points and terminal points in the respective partial regions are set such that initial points and terminal points are not exactly facing each other at the boundary line between the two partial regions, so that an initial point in one partial region faces the interspace between two initial points in the other partial region or a terminal point in one partial region faces the interspace between two terminal points in the other partial region. By such an arrangement, it is possible to supply heat energy to those positions in the other partial region at which a distance to neighboring initial points/terminal points of the other partial region is large, when the initial points/terminal points in the one partial region are solidified, so that a more homogeneous solidification of the building material at the boundary between the partial regions is effected.

The distances from the initial points/terminal points to the boundary between the partial regions should preferably be smaller than 10% of the minimum value of the beam widths of the beams at the terminal points of trajectories adjacent to the boundary, preferably smaller than 5%. Still more preferably, the two partial regions should overlap at the boundary, particularly preferably by at least 50% of the beam width. In this case, initial points/terminal points of the one partial region are arranged between trajectories of the other partial region, which may provide for an even larger homogeneity of the properties of the object after its solidification as the two partial regions have an interdigitation of trajectories at their boundary.

Furthermore, at the terminal point of the first trajectory, a reduction of the radiant flux incident on the terminal point by at least 50%, preferably by at least 80%, more preferably by at least 90%, still more preferably by 100%, is specified.

For a keyhole welding process to stop exactly at the terminal point of a solidification path, it is necessary to reduce the radiant flux incident on the terminal point so much that beyond the terminal point no evaporation of building material (keyhole formation) occurs. Preferably, beyond the terminal point no solidification or melting of building material occurs. A reduction of the radiant flux by 100%, by which this is effected, can be brought about by switching off the radiation source, meaning e.g. the laser, or else by deflecting the beam such that it impinges on other positions of the building plane or is incident on the building plane no longer at all. Alternatively, the radiant flux can be reduced at least so much that in the further movement of the beam beyond the terminal point an exceedance of the melting point and solidus temperature or liquidus temperature, respectively, of the building material cannot be effected. Usually, this is the case for a reduction of the radiant flux by more than 50%. A reduction of the radiant flux incident on the terminal point can e.g. be effected by a reduction of the output power of the radiation source or by the use of an attenuator. When a pulsed radiation source is used, it is possible to change also e.g. the duty cycle and/or the pulse frequency correspondingly. Alternatively, it is also possible to defocus the beam so much that the energy input per time and per unit area is no longer sufficient to effect a solidification and melting, respectively, of building material.

Further preferably, at the initial point of the second trajectory, an increase of the radiant flux incident on the initial point by at least 50%, preferably at least 80%, more preferably at least 90%, still more preferably at least 100% of the medium radiant flux incident on the second trajectory in the movement of the beam along the second trajectory is specified.

For a keyhole welding process to start exactly at the initial point of a solidification path, the radiant flux must not have values, at which in the movement of the beam across the building material an evaporation of the building material occurs already before reaching the initial point. Accordingly, the radiant flux incident on the second solidification path must be increased to values that are suitable for an evaporation of the building material only at the initial point of the second solidification path. Preferably, in a movement of a beam towards the initial point the radiant flux has a value, at which a sintering or melting of building material does not yet occur, meaning at which a solidus or liquidus temperature of the building material is still not exceeded.

The term "medium radiant flux incident on the second trajectory" refers to the fact that the incident radiant flux may vary during scanning of the second trajectory. If during scanning of the second trajectory the radiant flux incident on the second trajectory does not vary, the value of the medium radiant flux that is incident is equal to the constant value of the radiant flux incident on the second trajectory during scanning of the second trajectory. An increase of the radiant flux can e.g. be effected by an increase of the output power of the radiation source. When a pulsed radiation source is used, e.g. also the duty cycle and/or the pulse frequency can be changed accordingly. Alternatively, it is also possible to use a smaller focus, so that the energy input per time and per unit area is sufficient to effect a solidification and melting, respectively, of the building material.

Further preferably, between the terminal point and the initial point a movement of the, preferably fictive, beam on a continuous turn path, which preferably crosses itself in at least one point, is specified in the method.

In particular, if the movement direction of the beam when leaving the initial point of the second trajectory deviates from the movement direction of the beam when reaching the terminal point of the first trajectory, it is advantageous to move the beam without any step-like positional displacement, i.e. to move it along a continuous turn path. In doing so, it is possible to avoid too large delays and/or accelerations in the transition to the scanning of the second trajectory. Due to inertia of the beam deflection or scanning devices for moving a beam across the building plane, arbitrarily large delays and accelerations are not possible. With respect to the shape of the continuous turn path there are no limitations. It can e.g. be an oval or a polygon, wherein at the position of the initial point/terminal point there is a corner having an interior angle equal to the angle between the movement direction of the beam towards the terminal point and the movement direction of the beam away from the initial point. The shape can be chosen such that a transition time from the first trajectory to the second trajectory is as small as possible or e.g. such that the thermal and/or mechanical load of the deflection or scanning device is as small as possible during the movement. Preferably, when the beam follows the continuous turn path, it is switched off and a beam deflection device (e.g. a scanner) is nevertheless moved or driven as if the beam was switched on, i. e. it is a fictive beam.

Preferably, during the movement along the turn path the direction in the building plane in which the beam is moved away from the terminal point of the first trajectory and the direction in the building plane in which the beam is moved towards the initial point of the second trajectory are at an angle that is larger than or equal to 20° and/or smaller than or equal to 100°.

When the terminal point of the first solidification path and the initial point of the second solidification path shall overlap each other, it results that the first solidification path and the second solidification path need to touch each other at their ends. In order to avoid a too large curvature of the solidification paths when they are approaching each other, it is advantageous when the movement directions of the beam at the terminal point of the first trajectory and at the initial point of the second trajectory differ from each other by a minimum angle. At the same time a maximum angle between the movement directions should not be exceeded: When a deviation between the movement directions is too large, it is more difficult for the beam at the initial point to enter the crater that has formed at the terminal point due to the reduction of the radiant flux. The first angle can for example be determined such that in the building plane the angle between the corresponding tangents to the solidification paths at the initial point and terminal point, respectively, is determined.

Preferably, the first trajectory and/or the second trajectory have a curved section.

As already mentioned, the present invention first of all is related to hatch lines. Usually, by means of a hatch-type scanning of the building material the same is areally solidified in a region. For this purpose, usually the hatch lines are straight at at least 70% of their lengths, preferably at least 90% of their lengths. Only close to the initial point and/or the terminal point there exists a deviation from the straight course. Here, it is not necessary for both solidification paths to have a curved course at their corresponding ends for enabling adjacent solidification paths to overlap with their initial/terminal points. Rather, one of the two solidification paths may be 100% straight, whereas only the other comprises a curved section at its end. In general, arbitrary variations of the courses of adjacent trajectories that lead to an overlap of initial point and terminal point are possible. Here, the first trajectory and the second trajectory may be (axially) symmetric to each other, so that the initial point/terminal point then lies midway between two trajectories. However, courses of the first trajectory and the second trajectory that are asymmetric with respect to each other are also possible. A position of the initial point/terminal point that is closer to one of the two trajectories will then result. Preferably, the position of the initial point/terminal point with respect to the first trajectory and second trajectory is kept for a complete partial region of a cross-section of the object to be manufactured or for a complete cross-section or the whole object to be manufactured.

Furthermore, the approach according to the invention is similarly advantageous, when the trajectories do not have curved sections only at their ends, which means that also away from the initial point/terminal point of the trajectories there is a deviation from a straight course. In particular, trajectories may also be curved as a whole.

Preferably, the curved section of the first trajectory and/or of the second trajectory makes up at least 1%, preferably at least 5% and/or at most 50%, preferably at most 30%, more preferably at most 20% of the length of the trajectory. By a lower limit for the length of the curved section, curvatures that are two pronounced are avoided, in particular near the initial point/terminal point. Small curvature radii will lead to high acceleration values at the deflection devices (e.g. galvanometer mirrors) and thus to inaccuracies due to inertia of the deflection device and furthermore to loads that are too high for the galvanometer drivers. The upper limit for the length of the curved section expresses the fact that trajectories should preferably have a course that is as straight as possible, on the one hand in order to avoid radial accelerations, on the other hand because a course of the trajectories that is as straight as possible will allow for a simpler scanning strategy for a region to be solidified.

In an inventive additive manufacturing method for manufacturing a three-dimensional object, wherein the object is manufactured by an additive manufacturing apparatus by applying a building material layer upon layer and by solidifying the building material in a building plane by supplying radiation energy to positions in each layer assigned to the cross-section of the object in this layer in that these positions are scanned with at least one beam along a plurality of trajectories in accordance with a set of energy input parameter values, the procedure of the additive manufacturing method is controlled by a control data set which was generated using an inventive method of providing control data.

If control data provided according to the invention are used in a control data set that has been generated for the control of an additive manufacturing method, in particular for the control of a layer-wise additive manufacturing method such as a layer-wise powder melting or sintering method as e.g. SLS or DMLS or SLM, part homogeneity of the object can be improved.

In particular, a region to be selectively solidified is melted here along a first solidification path and a second solidification path substantially in parallel thereto by irradiation with at least one beam, so that after a cooling process the material exists in a solid state. Preferably, the movement vectors of the beams in the building plane have directional components opposite to each other during the scanning along the solidification paths. For example, the movement vectors can be arranged such that they are twisted by 180° against each other. Furthermore, a terminal point of the first solidification path overlaps with an initial point of the second solidification path at least to such a degree that the melt pool generated at the initial point of the second solidification path by the beam overlaps the crater forming at the terminal point of the first solidification path by a keyhole welding process. Usually this is the case, when the terminal point of the first solidification path has a distance from the initial point of the second solidification path that is smaller than half of the beam width of the beam at the terminal point, preferably smaller than a quarter of the beam width of the beam at the terminal point. The terminal point of the first solidification path, which coincides with the terminal point of the first trajectory, can by approximation be considered to be the geometric center or centroid of the melt pool generated by the beam at the terminal point in the building plane. In the same way, the initial point of the second solidification path coincides with the initial point of the second trajectory and can by approximation be considered to be the geometric center of the melt pool generated by the beam at the initial point in the building plane.

Preferably, in the inventive additive manufacturing method, the object is manufactured from a metal-based building material and for a solidification of the building material an amount of radiation energy is supplied to the same that is sufficient to melt it in a keyhole welding process, wherein the radiant flux of the beam arriving at the terminal point of the first trajectory is set such that due to the keyhole welding process a recess is formed in the building material at the terminal point and wherein the position of the initial point of the second trajectory is set such that the beam that is directed to the initial point impinges at least partially, preferably completely, on the recess.

An inventive device for providing control data for an additive manufacturing apparatus for manufacturing a three-dimensional object, wherein the object is manufactured by the additive manufacturing apparatus by applying a building material layer upon layer and by solidifying the building material in a building plane by supplying radiation energy to positions in each layer assigned to the cross-section of the object in this layer in that these positions are scanned with at least one beam along a plurality of trajectories in accordance with a set of energy input parameter values, comprises:

a data access unit configured to access computer-based model data of at least one portion of the object to be manufactured, a data model generation unit configured to generate at least one data model of a region to be selectively solidified of a building material layer for the manufacture of at least one object portion, wherein the data model specifies a solidification of the building material by a scanning of positions of the region to be selectively solidified along a first trajectory and along a second trajectory adjacent thereto with at least one beam, wherein during the scanning of the two trajectories the movement vectors of the beam in the building plane have directional components opposed to each other, wherein it is specified that an initial point of the second trajectory has a distance from a terminal point of the previously scanned first trajectory that is smaller than half of the beam width of the beam at the terminal point of the first trajectory and a control data provision unit configured to provide control data according to the at least one data model generated by the data model generation unit for the generation of a control data set for the additive manufacturing apparatus.

For the generation of the control data set, the data model generated in the second step can be provided by the control data provision unit itself in that the same integrates the generated data model into a control data set for the additive manufacturing apparatus. However, providing also includes a transfer of the data model to a data processing device that integrates the data model into a control data set or a direct transfer to an additive manufacturing apparatus. It is in particular possible to dynamically supply data models for object cross-sections to be manufactured to an additive manufacturing apparatus during a manufacturing process in the same. In particular, data models generated in the second step need not individually be provided for an additive manufacturing process. Rather, it is possible to collect at first several generated data models and then provide the same in their entirety for the integration into a control data set. The provision can also comprise a generation of the data model.

An inventive device for a computer-based control of a number of energy input devices of an additive manufacturing apparatus for manufacturing a three-dimensional object with the same, wherein the object is manufactured by the additive manufacturing apparatus by applying a building material layer upon layer and by solidifying the building material in a building plane by supplying radiation energy to positions in each layer assigned to the cross-section of the object in this layer in that these positions are scanned with at least one beam along a plurality of trajectories in accordance with a set of energy input parameters, is configured such that a solidification of the building material by a scanning of positions of the region to be selectively solidified along a first trajectory and a second trajectory adjacent thereto with at least one beam is specified, wherein during scanning of the two trajectories, the movement vectors of the beam in the building plane have directional components opposed to each other, wherein it is specified that an initial point of the second trajectory has a distance from a terminal point of the previously scanned first trajectory that is smaller than half of the beam width of the beam at the terminal point of the first trajectory.

The device for a computer-based control of a number of energy input devices can be implemented by software components alone, by means of a mixture from hardware and software components or even by hardware components alone. For the manufacture of a three-dimensional object, a device that is implemented by software components alone can in particular interact with a control device in an additive manufacturing apparatus or can be integrated in such a control device. By means of the device for a computer-based control of a number of energy input devices, part homogeneity of objects manufactured by an additive manufacturing method can be improved. In particular, it is possible that the device implements a manufacturing of objects by an additive manufacturing method based on a control data set that was generated by means of an inventive method of providing control data.

An inventive additive manufacturing apparatus for manufacturing a three-dimensional object, wherein in the additive manufacturing apparatus the object is manufactured by applying a building material layer upon layer and by solidifying the building material by supplying radiation energy to positions in each layer assigned to the cross-section of the object in this layer in that these positions are scanned with at least one beam along a plurality of trajectories in accordance with a set of energy input parameters, comprises:

a layer application device configured to apply a layer of a building material onto an already existing, preferably already selectively solidified, building material layer, an energy input device configured to supply radiation energy to positions assigned to the cross-section of the object in a layer by scanning these positions with at least one beam along a plurality of trajectories in accordance with a set of energy input parameter values, wherein the additive manufacturing apparatus according to the invention comprises an inventive device for a computer-based control of a number of energy input devices of an additive manufacturing apparatus and/or is connected to such a device by means of signaling.

Here, an energy input device may comprise a number of radiation sources for generating radiation, e.g. electromagnetic radiation or particle radiation, and a number of beam deflecting or redirecting devices connected thereto for directing the radiation onto the building material. In particular, preferably exactly one beam is assigned to a beam deflection device. The radiation sources may, for example, be one or more gas or solid-state lasers or any other type of laser such as laser diodes, in particular VCSELs (Vertical Cavity Surface Emitting Lasers) or VECSELs (Vertical External Cavity Surface Emitting Lasers) or a line of these lasers.

When generating the control data in the additive manufacturing apparatus, it is in particular possible to generate the control data by the data model generation unit during a manufacturing process by dynamically generating data models for (partial) object cross-sections still to be manufactured.

An inventive computer program has program code means for executing all steps of an inventive computer-based method of providing control data for an additive manufacturing apparatus and/or an inventive additive manufacturing method, when the computer program is executed by a data processor, in particular a data processor interacting with an additive manufacturing apparatus.

"Interacting" means here that the data processor either is integrated in the additive manufacturing apparatus or is able to exchange data with it. The implementation of the inventive method of providing control data and of the respective device by means of software makes possible an easy installability on different computing systems at different locations possible (for example at the creator of the design of the object or else at the operator of the additive manufacturing apparatus).

BRIEF DESCRIPTION OF THE DRAWINGS

Further features and practicalities of the invention will arise from the description of embodiments based on the attached drawings.

DETAILED DESCRIPTION OF THE EMBODIMENTS

Figure 1:
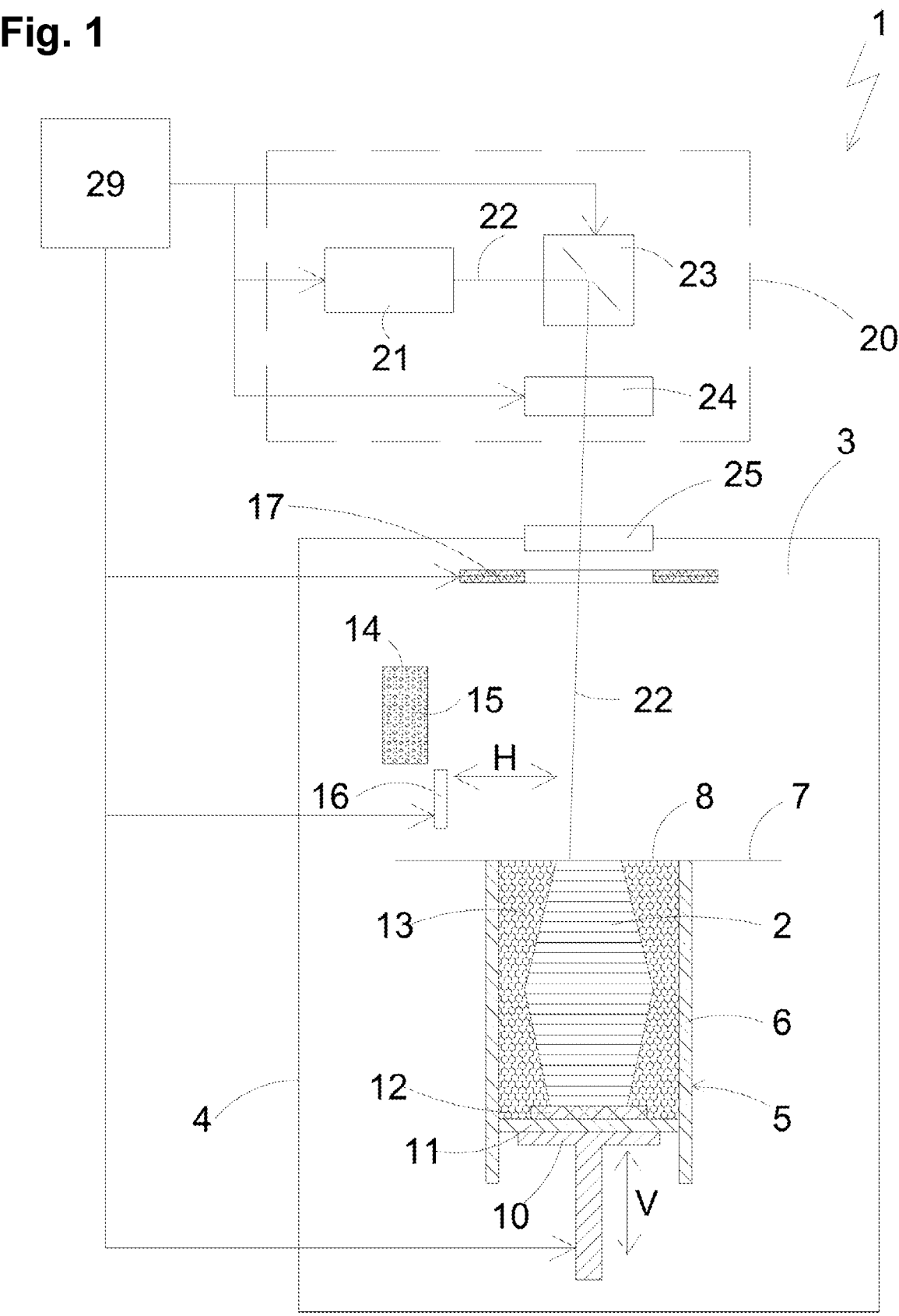
FIG. 1 shows a schematic, partially cross-sectional view of an exemplary apparatus for an additive manufacture of a three-dimensional object according to an embodiment of the invention.

In the following, for a description of the invention at first an additive manufacturing apparatus according to the invention shall be described at the example of a laser sintering apparatus or laser melting apparatus with reference to FIG. 1.

For building an object 2, the laser sintering or laser melting apparatus 1 comprises a process chamber or build chamber 3 having a chamber wall 4. A build container 5 open to the top and having a container wall 6 is arranged in the process chamber 3. A working plane 7 (also termed building plane) is defined by the top opening of the build container 5, wherein the area of the working plane 7 located within the opening, which area can be used for building the object 2, is referred to as build area 8.

In the build container 5, a support 10 is arranged, which can be moved in a vertical direction V and to which a base plate 11 is attached that seals the container 5 at the bottom and thus forms the bottom thereof. The base plate 11 can be a plate formed separately from the support 10, which is fixed to the support 10, or it can be integrally formed with the support 10. Depending on the powder and process used, a building platform 12 as building support on which the object 2 is built can be additionally arranged on the base plate 11. However, the object 2 can also be built on the base plate 11 itself, which then serves as a building support. In FIG. 1, the object 2 to be formed in the container 5 on the building platform 12 is shown below the working plane 7 in an intermediate state with several solidified layers, surrounded by building material 13 that remained unsolidified.

The laser sintering or melting apparatus 1 further comprises a storage container 14 for a building material 15, in this example a powder that can be solidified by electromagnetic radiation, and a recoater 16 that can be moved in a horizontal direction H for applying building material 15 within the build area 8. Optionally, a heating device, e.g. a radiant heater 17, can be arranged in the process chamber 3 for heating the applied building material. For example, an infrared heater can be provided as radiant heater 17.

The exemplary additive manufacturing apparatus 1 further comprises an energy input device 20 having a laser 21 generating a laser beam 22 that is deflected by a deflection device 23, e.g. one or more galvanometer mirrors with a dedicated drive, and focused on the working plane 7 by a focusing device 24 through a coupling window 25 that is arranged at the top side of the process chamber 3 in the chamber wall 4.

In laser sintering or laser melting, an energy input device can for example comprise one or more gas or solid-state lasers or any other laser types such as laser diodes, in particular VCSEL (Vertical Cavity Surface Emitting Laser) or VECSEL (Vertical External Cavity Surface Emitting Laser) or a line of these lasers. Therefore, the specific setup of a laser sintering device or laser melting device shown in FIG. 1 is only exemplary for the present invention and may of course be modified, in particular when using a different energy input device than the one that is shown. In order to indicate that the area of the area of incidence of the radiation on the building material need not necessarily be very small ("point-shaped"), in this application often the term "beam" is used synonymously to "ray".

The laser sintering apparatus 1 additionally comprises a control device 29, by which the individual components of the apparatus 1 can be controlled in a coordinated manner in order to carry out the building process. Alternatively, the control device can also be arranged in parts or completely outside of the additive manufacturing apparatus. The control device can comprise a CPU, the operation of which is controlled by a computer program (software). The computer program can be stored separate from the additive manufacturing apparatus in a storage device from where it can be loaded (e.g. via a network) into the additive manufacturing apparatus, in particular into the control device.

In operation, the support 10 is lowered layer by layer by the control device 29, the recoater 16 is controlled such that a new powder layer is applied and the deflection device 23 and, as the case may be, also the laser 21 and/or the focusing device 24 are controlled such that for a solidification of the respective layer at the positions corresponding to the respective object these positions are scanned with the laser.

All statements made further down do not only apply to laser sintering apparatuses or laser melting apparatuses but also to additive manufacturing apparatus of other types, in which heat energy is introduced into the building material by means of radiation.

In the additive manufacturing apparatus that was just described by way of example, a manufacturing process proceeds such that the control device 29 processes a control dataset.

By the control data set, it is specified for an energy input device, in the case of the above laser sintering or laser melting apparatus specifically the deflection device 23, to which position of the working plane 7 radiation shall be directed at each point in time during the solidification process. As shown in FIG. 8, a device 100 for providing control data for an additive manufacturing apparatus comprises a data access unit 101, a data model generation unit 102 and a control data provision unit 103. The functioning of the device 100 for providing control data will be exemplarily described making reference to FIG. 7.

In the device 100 for providing control data for an additive manufacturing apparatus, at first the data access unit 101 accesses a number, meaning one or more, of layer data sets, each of which comprises a data model of a region to be selectively solidified of a building material layer during the manufacturing that corresponds to a cross-section of an object portion, preferably a data model of the complete region to be solidified of a building material layer. In the process flow shown in FIG. 7, this is the first step S1.

Figure 7:
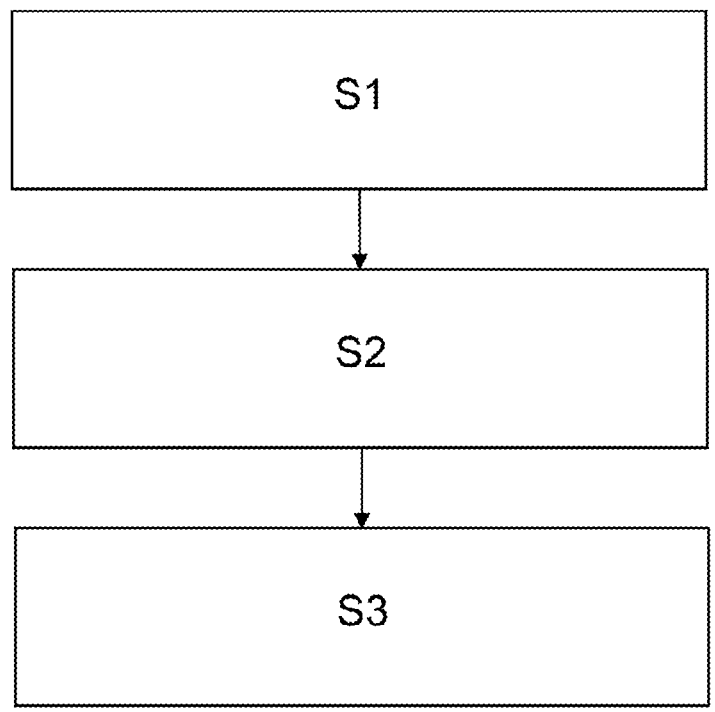
FIG. 7 illustrates the procedure of a method of providing control data.
Figure 8:
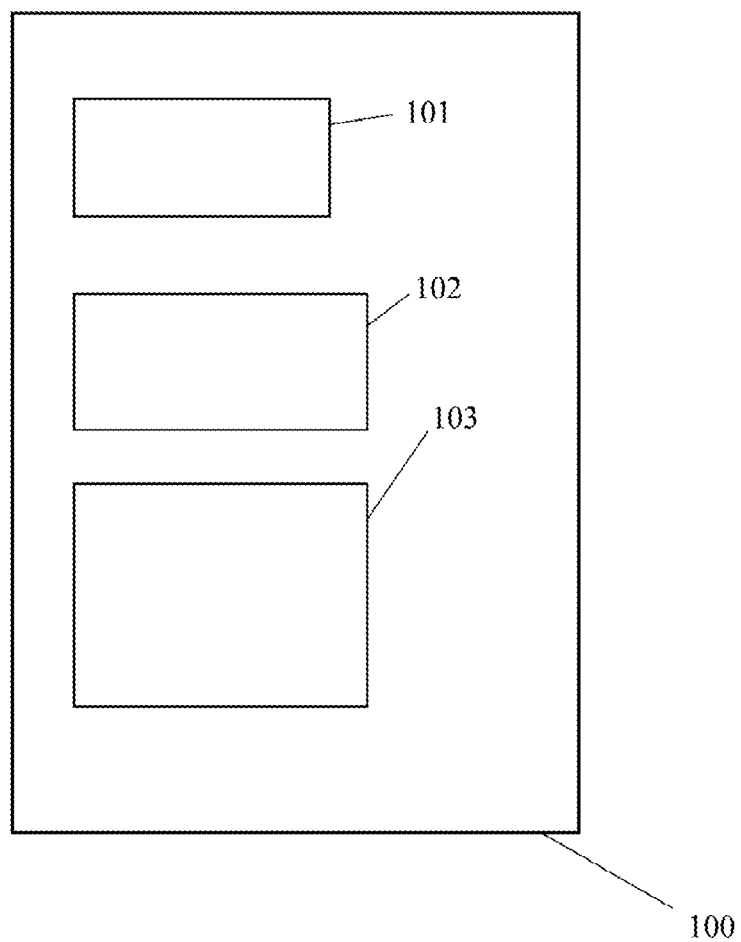
FIG. 8 shows the schematic setup of a device for providing control data.
Figure 10:
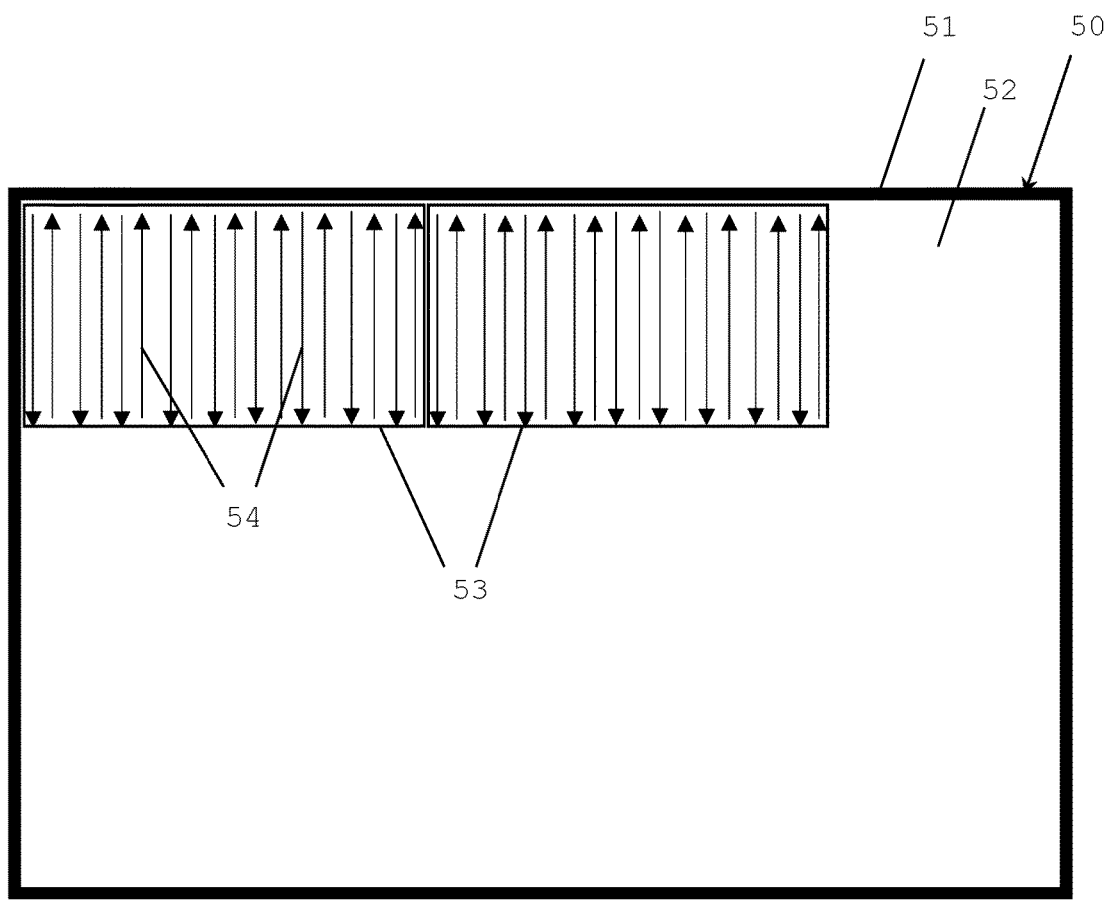
FIG. 10 shows an approach known to the applicant for scanning an object cross-section with energy radiation.
Figure 11:
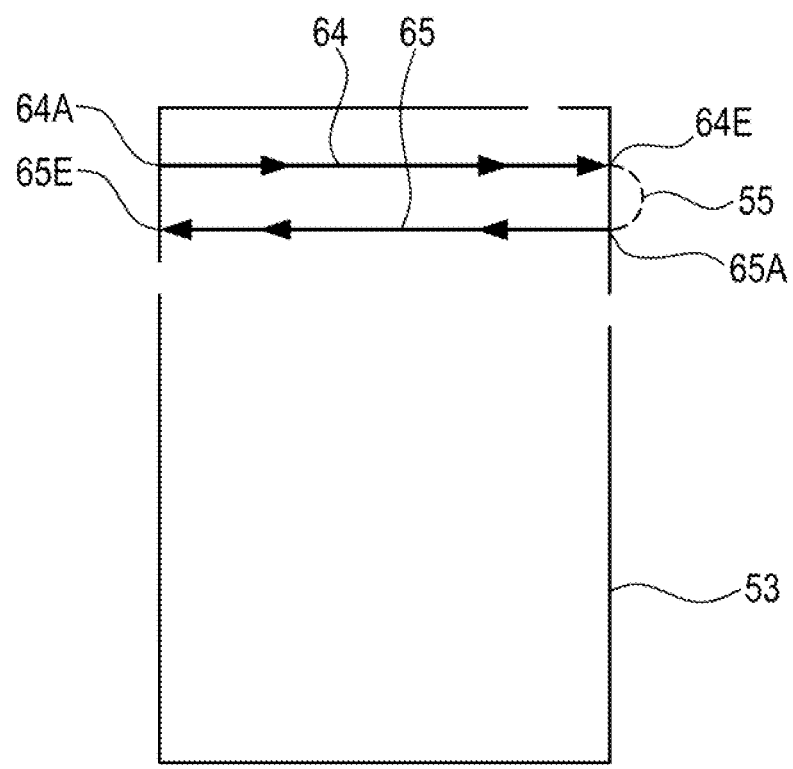
FIG. 11 serves for a further explanation of the approach shown in FIG. 10.

In the second step S2 shown in FIG. 7, the data model generation unit 102 specifies in at least one data model of at least one object portion a solidification of positions of a building material layer in a temporal sequence that corresponds to the movement of a beam along a trajectory across the building material. In particular, the movement is specified here in an inner region 52 of an object cross-section 50 along trajectories 54 shown in FIGS. 10 and 11, in particular in a partial region 53 of the inner region 52, thus e.g. in a stripe.

After at least one data model has been generated in the second step S2 in FIG. 7, control data for the generation of a control data set are then provided by the control data provision unit 103 shown in FIG. 8 (in FIG. 7, this is step S3). Here, the at least one data model generated in the second step S2 can be provided either as control information (control data) or else the data model is re-formatted for a better integrability into a control data set. The described approach can be applied for all trajectories within a stripe-shaped or quadratic partial region.

Figure 2:
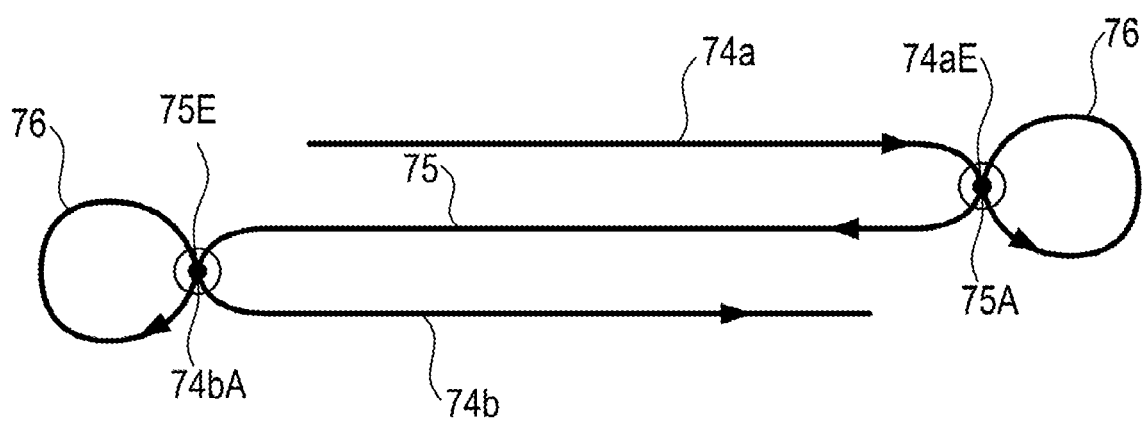
FIG. 2 schematically shows an example for the inventive approach in a solidification of a stripe-shaped partial region ("hatching") of an object cross-section.

In an additive manufacturing method that is controlled by a control data set that was generated based on the control data provided in step S3, the building material is then scanned with a beam along trajectories (in the following also named hatch lines) that lie substantially in parallel to each other, e.g. in order to solidify an inner region 52. For this, the control device 29 correspondingly drives the reflection device 23. FIG. 2 shows a detail of a partial region 53 of an inner region 52, based on which the differences to the approach of the prior art shown in FIG. 11 shall be made clear. Again, in FIG. 2 the directions, in which a beam is moved along the hatch lines, are indicated by arrows. Here, adjacent hatch lines are scanned in opposite directions so that in the figure hatch lines 74a, 74b, which are scanned from left to right, and hatch lines 75, which are scanned from right to left, can be distinguished. In the figure, hatch line 75 is scanned after hatch line 74a and hatch line 74b is scanned after hatch line 75.

As can be seen in FIG. 2, the initial point 75A of the second hatch line 75, meaning the position of this hatch line that is scanned at first in time, substantially coincides with the terminal point 74aE of the first hatch line 74a, meaning the position of this hatch line that is scanned last in time. In the same way, the initial point 74bA of the third hatch line 74b substantially coincides with the terminal point 75E of the second hatch line 75. In this example, when transitioning from the terminal point of a hatch line to the initial point of the following hatch line, the deflection device 23 is driven such that the beam is moved on a continuous turn path 76. In this section 76, either the radiant flux supplied to the building material by the beam is attenuated so much that a boiling temperature is not exceeded, in particular a melting temperature and solidus temperature or liquidus temperature, respectively, of the building material is not exceeded, in other words so much that no solidification of the building material is effected, or else the radiant flux per unit area (radiant flux density) is lowered to a value near zero, e.g. by blocking and interrupting, respectively, the radiation or by switching-off the radiation source.

A control of the deflection device 23 such that even for a switched-off laser the non-existing beam is moved along the continuous turn path 76, makes it possible that a deceleration process of the galvanometer mirrors of the deflection device 23 can be carried out at least partially after a switching-off of the energy input device and that an acceleration process of the galvanometer mirrors of the deflection device 23 can be carried out at least partially before a switching-on of the energy input device. Possibly, during alternating hatching, the deceleration and acceleration, respectively, can also be carried out completely in the reversal zone.

Here, the continuous turn path 76 is chosen such that an optimal turning process is guaranteed. Here, a minimum or maximum turning time, meaning the time within which the path 76 is traversed, can be chosen as criterion for optimization. Alternatively or additionally, the path 76 can be chosen such that the deflection device 23 is operated with an energy efficiency that is as high as possible or such that the load of a galvanometer drive is as small as possible.

Figure 9:
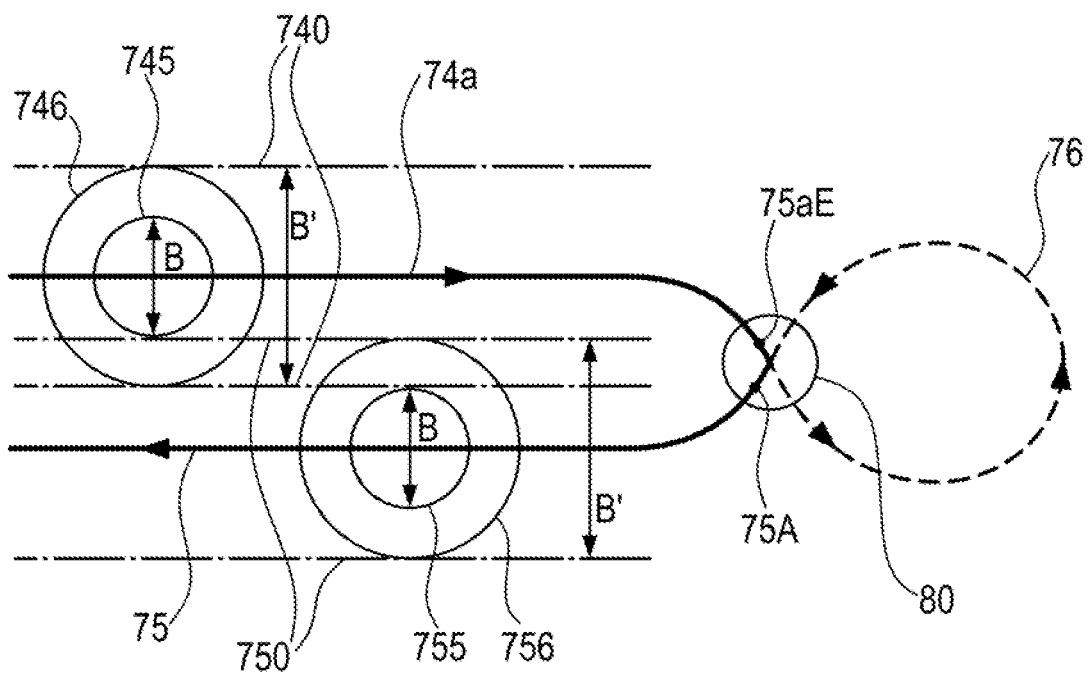
FIG. 9 schematically illustrates an example for the approach in a manufacturing process according to the invention.

In the following, based on FIG. 9 it is explained, how the course of the trajectories specified in the data model on which the control data are based affects the manufacturing process in the additive manufacturing apparatus. FIG. 9 schematically shows a top view of the building plane in the region of the first hatch line (trajectory) 74a and the second hatch line (trajectory) 75 of FIG. 2. FIG. 9 illustrates the edges 740 and 750 of the regions (solidification paths) assigned to the two trajectories 74a and 75, respectively, inside of which the building material is melted due to the movement of the laser beam along the trajectory and which are designated as melt tracks out of this reason. Furthermore, beams 745, 755, which are circular by way of example, are shown on both trajectories in FIG. 9 in order to illustrate the size relation between the width B of the beam on the one hand, meaning the extension perpendicular to the respective trajectory, and the width B' of the melt track on the other hand. The region 746, 756 that has been melted by each of the two beams is by way of approximation also shown circular-shaped. In particular, it can be seen that the regions 740 and 750, which correspond to the hardened solidification paths, overlap as it is often the case in order to avoid gaps with building material that has not been solidified in a satisfying way. The width of the overlap region is set e.g. between 5% and 10% of the width of one of the solidification paths 740 and 750, respectively.

Furthermore, a crater 80 that has remained due to the switching-off and the reduction of the radiant flux, respectively, and which was already mentioned further above, can be seen in FIG. 9 at the end 74aE of the trajectory 74. It is emphasized that this crater 80 is shown only very schematically. It will not necessarily have the circular shape shown in the figure and will tend to have a smaller diameter than the solidification path 740. Also, the terminal point 74aE will usually not lie exactly at the center of the crater 80.

By means of a dashed line, FIG. 9 shows a (fictive) movement of the beam along the reversal trajectory 76 effected by the beam deflection device 23. The movement is termed fictive as for a switched-off beam after the scanning of the terminal point 74aE it is in fact not appropriate to speak about a movement of a beam. If after the scanning of the terminal point 74aE the beam is not switched off, but only the radiant flux is lowered, the dashed path 76 illustrates the movement of the beam in the building plane up to the arrival at the initial point 75A of the trajectory 75. However, as can be seen in FIG. 9, no melting or solidification of building material occurs before the initial point 75A is reached.

As can be further seen in FIG. 9, the initial point 75A in this example is not located exactly at the center of the crater 80 or at the position of the terminal point 74aE, even though this would be desirable. The figure shall illustrate the situation in reality, where a distance between the terminal point 74aE and the initial point 75A may well exist. Such a distance can be tolerated as long as it is not larger than half of the beam width B of the beam with which the first trajectory 74a is scanned at the terminal point 74aE, preferably not larger than a quarter of the beam width B, more preferably smaller than 10% of the beam width B of the beam. It is important here that the melt pool that develops when the second trajectory 75 is scanned fills the crater 80 as much as possible or as completely as possible. Then, as was already mentioned further above, it can be insured that during scanning of the second trajectory 75 a keyhole welding process is reached more quickly.

Figure 3:
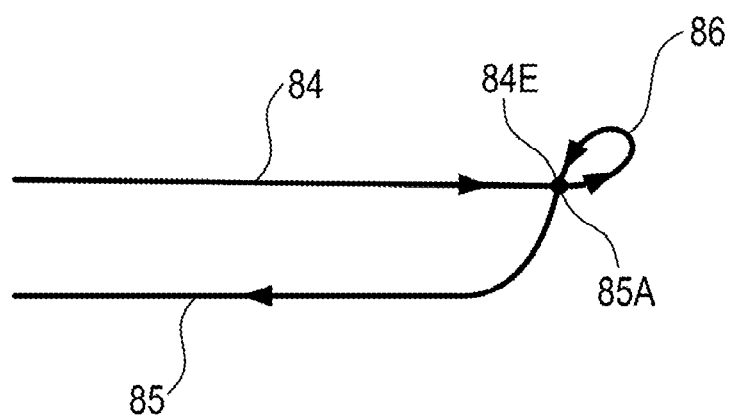
FIGS. 3 and 4 schematically show further examples of possible courses of trajectories at the initial point/terminal point in accordance with the invention.
Figure 4:
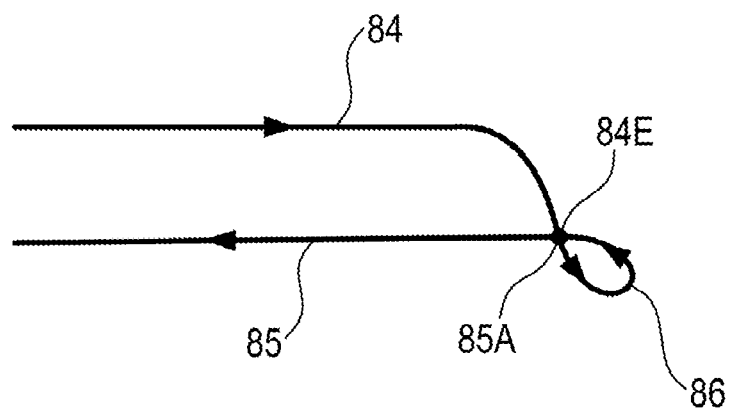

It is apparent that by the described approach two adjacent hatch lines, which as such run substantially parallel to one another, approach each other at their ends. In other words, near the initial points and terminal points there occurs a deviation from the parallel course of the two lines. Though in FIG. 2 and in FIG. 9 a case is shown in which the initial point/terminal point is symmetric to the two trajectories or solidification paths, this need not be so. FIG. 3 shows a straight course of the hatch line 84 up to its terminal point 84E, while, after the turn path 86 has been traversed, the hatch line 85 at first shows a curved course near its initial point 85A, before in the further course it runs in parallel to the hatch line 84. The mirror constellation, in which the hatch line 84 shows a curved course near its terminal point 84E, while the hatch line 85 when starting at its initial point 85A shows a straight course, as shown in FIG. 4, is also possible. In fact, there exist many possibilities for the position of the overlapping initial points/terminal points. Also, where to position the initial point/terminal point can be made dependent on the fact, which shape of the continuous turn path 76, 86 leads to a transition time from the first hatch line to the second hatch line that is as small as possible, or can be made dependent on the fact, which shape of the continuous turn path 76, 86 leads to a thermal load and/or mechanical load of the deflection device that is as small as possible.

Preferably, in a top view of the building plane, the beam at the initial point of the second hatch line moves substantially in the same direction, more preferably in exactly the same direction, as the beam at the terminal point of the first hatch line. In this case, the best results will be achieved as the beam then is able to enter particularly well the crater existing at the end of the first hatch line, in particular if the angle between the direction of incidence of the beam at the initial point and the direction of incidence of the beam at the terminal point is very small, meaning smaller than 10°, preferably smaller than 5°, particularly preferably smaller than 1°. However, good results can also be achieved, when the direction during scanning of the initial point differs from the direction during scanning of the terminal point by an angle that is smaller than 100°, preferably smaller than 90° and more preferably smaller than 20°.

Figure 5:
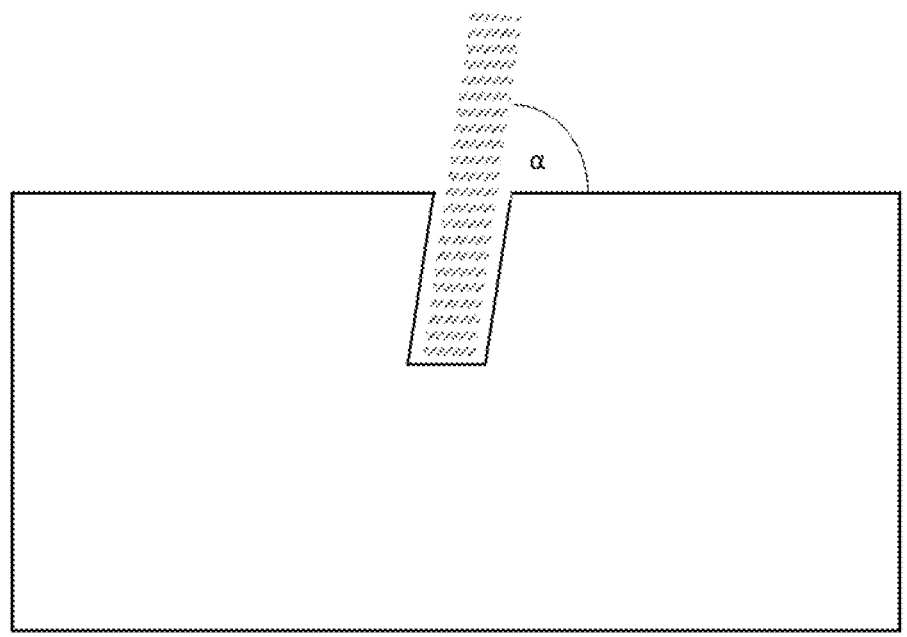
FIG. 5 schematically shows the directing of a beam to the initial point of a solidification path that coincides with a terminal point of the previous solidification path, wherein at the terminal point a recess has remained due to an abrupt reduction of the radiant flux supplied by the beam, which is not perpendicularly incident on the building plane.

A deviation of the movement direction of the beam during scanning of the initial point with respect to the movement direction of the beam during scanning of the terminal point that is as small as possible is particularly important, when the beam is not perpendicularly incident on the building plane. In such a case, a crater at the terminal point of the first solidification path will not be perpendicular to the building plane, as it is illustrated by means of FIG. 5. In order to reach as quickly as possible a stable condition (in particular a keyhole welding regime) near the initial point of the second trajectory, the inclination angle alpha during scanning of the initial point should be identical or at least similar to the inclination angle relative to the building plane during scanning of the terminal point.

The terminal points of the hatch lines define the boundary of a partial region 53. When the initial points and terminal points of two adjacent hatch lines overlap with one another, as a result the distance to other adjacent hatch lines at the boundary of the partial region 53 may become larger. Optionally, one can take this situation into account by matching the courses of the trajectories (hatch lines) in two adjacent partial regions 53, as it is shown in FIG. 6.

Figure 6:
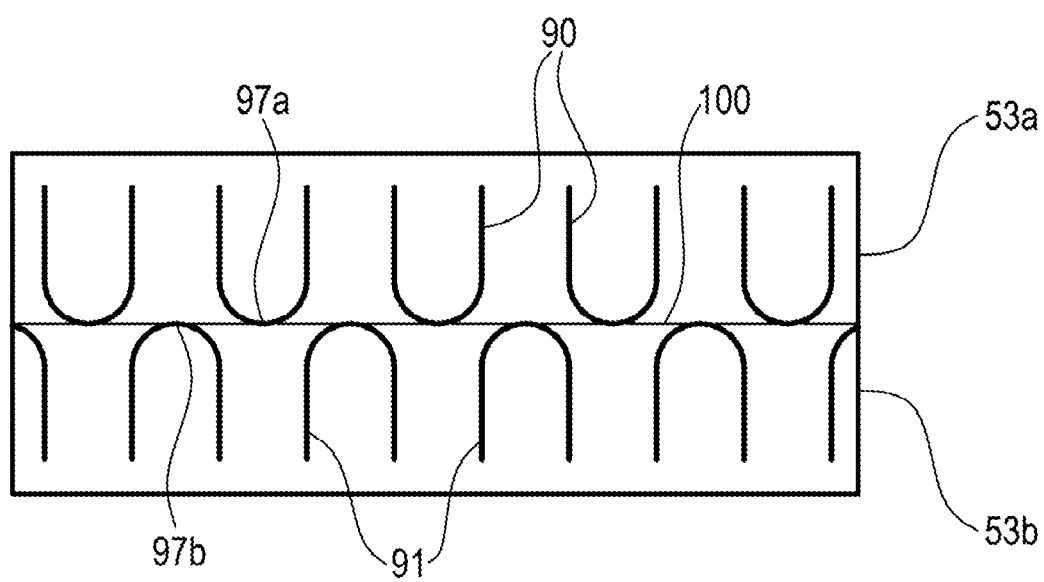
FIG. 6 schematically shows a preferred approach at the boundary between two partial regions.

FIG. 6 shows two adjoining partial regions 53a, 53b. The boundary 100 is illustrated by a dashed line. In the upper partial region 53a, hatch line pairs or trajectory pairs that overlap with their initial points/terminal points 97a at their ends facing the partial region 53b do have the reference sign 90 (in the figure, for making the illustration clearer, only two hatch line pairs are shown by way of example with the reference sign 90). In the lower partial region 53b, hatch line pairs that overlap with their initial points/terminal points 97b at their ends facing the partial region 53a do have the reference sign 91 (in the figure, for making the illustration clearer, only two hatch line pairs are shown by way of example with the reference sign 91). It can be seen in FIG. 6 that near the boundary line 100 the horizontal distance between each adjacent hatch line pairs 90 or 91 is a maximum. In order to ensure sufficient energy for a solidification of the building material is introduced also there, the hatch line pairs 91 in the partial region 53b are positioned such that at the boundary 100 between the two partial regions the initial points/terminal points 97b of the hatch line pairs 91 lie exactly between the initial points/terminal points 97a of the hatch line pairs 90. As a result, heat energy is supplied to those positions, at which the distance between adjacent hatch line pairs 90 or 91 is a maximum, during the solidification of the adjoining partial region, which provides for a more uniform solidification of the building material at the boundaries between partial regions.

Furthermore, optionally, one can also provide for an overlap of the partial regions 53a, 53b. Thus, in FIG. 6 the partial region 53a or the hatch line pairs 90 in the same would be shifted towards the partial region 53b and/or the partial region 53b or the hatch line pairs 91 in the same would be shifted towards the partial region 53a. This can provide for a more uniform solidification. The amount of shifting of a partial region towards the other can be chosen such that it corresponds to half of the beam width of a beam used in this partial region, however, preferably, lies below the same, e.g. corresponds to a quarter of the beam width.

Finally, it should be mentioned that an inventive device 100 for providing control data for an additive manufacturing apparatus may be implemented not only by software components alone, but also by hardware components alone or mixtures of hardware and software. In particular, interfaces mentioned in the present application do not necessarily have to be implemented as hardware components, but may also be implemented as software modules, for example, when the input or output data can be taken over from other components already implemented on the same device or have to be transferred to another component only by software. Likewise, the interfaces may consist of hardware and software components, such as a standard hardware interface that is specially configured by software for the specific application. In addition, several interfaces may also be combined in a common interface, for example an input-output interface.

What is claimed:

1. An additive manufacturing method for manufacturing a three-dimensional object, comprising:
   manufacturing the three-dimensional object with an additive manufacturing apparatus by applying a building material layer upon layer and by sintering or melting the building material in a building plane by supplying radiation energy to positions in each layer assigned to a cross-section of the three-dimensional object in that the positions are scanned with at least one beam along a plurality of trajectories in accordance with a set of energy input parameter values;
   accessing computer-based model data of at least one portion of the three-dimensional object;
   generating at least one data model of a region of a layer of the building material to be selectively solidified, wherein the data model specifies a scanning of positions of the region to be selectively solidified by moving the at least one beam along a first trajectory and along a second trajectory substantially parallel to the first trajectory, wherein movement vectors of the at least one beam in the building plane have directional components opposed to each other during the scanning along the first trajectory and the second trajectory, wherein an initial point of the second trajectory has a distance from a terminal point of the first trajectory that is smaller than half of a beam width of the at least one beam at the terminal point of the first trajectory, wherein the generating step specifies a movement of the at least one beam on a continuous turn path between the terminal point and the initial point and wherein the first trajectory has a curved section immediately before the terminal point and/or the second trajectory has a curved section immediately after a starting point; and
   providing control data according to the at least one data model generated in the generating step for a generation of a control data set for the additive manufacturing apparatus, wherein the manufacturing of the three-dimensional object is controlled by the control data set.

2. The method of claim 1, wherein the control data are provided for the manufacturing of the three-dimensional object from a metal-based building material and wherein a radiant flux incident on the initial point and/or a radiant flux incident on the terminal point are set such that keyhole welding occurs when the radiation energy acts on the building material.

3. The method according to claim 1, wherein a first movement speed v1 is set for movement of the at least one beam along the first trajectory, wherein the at least one beam is moved across the terminal point with at least 80% of a value of the first movement speed, and/or a second movement speed v2 is set for the movement of the at least one beam along the second trajectory, wherein the at least one beam is moved across the initial point with at least 80% of a value of the second movement speed v2.

4. The method according to claim 1, wherein a direction of incidence of the at least one beam at the initial point of the second trajectory is set such that an angle to a direction of incidence of the at least one beam at the terminal point of the first trajectory is smaller than 15°.

5. The method according to claim 1, wherein the at least one beam includes at least a first beam and a second beam, the first beam being directed to the initial point of the second trajectory and being different from the second beam that was directed to the terminal point of the first trajectory.

6. The method according to claim 1, wherein the generating step includes specifying a solidification of the region by at least a first partial region and a second partial region, wherein each of the partial regions comprises a plurality of first and second trajectories,
wherein the first partial region and the second partial region adjoin each other at a boundary such that initial points and terminal points of the first and second trajectories of the first partial region adjoin initial points and terminal points of the first and second trajectories of the second partial region; and
wherein the initial points of the second trajectories of one of the first and second partial regions face an interspace between initial points of the second trajectories in the other of the first and second partial regions and/or face an interspace between the second trajectories in the other of the first and second partial regions.

7. The method according to claim 1, wherein a direction in the building plane in which the at least one beam is moved away from the terminal point of the first trajectory and a direction in the building plane in which the at least one beam is moved towards the initial point of the second trajectory are at an angle that is larger than or equal to 20° and/or smaller than or equal to 100°.

* * * * *